(12) United States Patent
Inoue

(10) Patent No.: US 12,359,078 B2
(45) Date of Patent: Jul. 15, 2025

(54) RESIN SOLUTION FOR PRINTING

(71) Applicant: ZEON CORPORATION, Tokyo (JP)

(72) Inventor: Hiroyasu Inoue, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 588 days.

(21) Appl. No.: 17/596,026

(22) PCT Filed: Jun. 2, 2020

(86) PCT No.: PCT/JP2020/021709
§ 371 (c)(1),
(2) Date: Dec. 2, 2021

(87) PCT Pub. No.: WO2020/250748
PCT Pub. Date: Dec. 17, 2020

(65) Prior Publication Data
US 2022/0315782 A1    Oct. 6, 2022

(30) Foreign Application Priority Data

Jun. 14, 2019 (JP) ................................. 2019-111477

(51) Int. Cl.
| | | |
|---|---|---|
| C09D 11/108 | (2014.01) | |
| C08K 3/22 | (2006.01) | |
| C08K 5/01 | (2006.01) | |
| C08L 53/02 | (2006.01) | |
| C09D 11/322 | (2014.01) | |
| C09D 11/36 | (2014.01) | |

(52) U.S. Cl.
CPC ............ *C09D 11/108* (2013.01); *C08L 53/02* (2013.01); *C09D 11/322* (2013.01); *C09D 11/36* (2013.01); *C08K 2003/2237* (2013.01); *C08K 5/01* (2013.01)

(58) Field of Classification Search
CPC ........ C08L 53/02; C08L 53/025; C09D 11/36; C09D 11/38; C09D 11/106; C09D 11/108; C09D 11/322; C08F 236/10
See application file for complete search history.

(56) References Cited

U.S. PATENT DOCUMENTS

| | | | |
|---|---|---|---|
| 5,191,024 A | 3/1993 | Shibata et al. | |
| 5,206,301 A | 4/1993 | Hattori et al. | |
| 5,216,074 A | 6/1993 | Imai et al. | |
| 5,306,779 A | 4/1994 | Shibata et al. | |
| 5,346,964 A | 9/1994 | Shibata et al. | |
| 7,622,199 B2 | 11/2009 | Tanaka et al. | |
| 10,374,190 B2 | 8/2019 | Tazaki et al. | |
| 11,440,303 B2 * | 9/2022 | Kurihara | B32B 27/08 |
| 2003/0225188 A1 | 12/2003 | Horie | |
| 2005/0119403 A1 | 6/2005 | St. Clair | |
| 2006/0132034 A1 * | 6/2006 | Cho | B82Y 20/00 |
| | | | 445/25 |
| 2008/0187708 A1 * | 8/2008 | Decker | C09D 5/004 |
| | | | 428/339 |
| 2009/0261719 A1 | 10/2009 | Nimura et al. | |
| 2011/0234477 A1 | 9/2011 | Sano et al. | |
| 2012/0283375 A1 | 11/2012 | Kageyama | |
| 2013/0251897 A1 | 9/2013 | Uang | |
| 2016/0343970 A1 | 11/2016 | Tazaki et al. | |
| 2017/0073513 A1 | 3/2017 | Flood et al. | |
| 2017/0222183 A1 | 8/2017 | Cho et al. | |
| 2018/0037514 A1 * | 2/2018 | Chowdhury | B41M 5/5254 |
| 2018/0130975 A1 | 5/2018 | Law et al. | |
| 2018/0320008 A1 | 11/2018 | Fedynyshyn et al. | |
| 2019/0006623 A1 | 1/2019 | Inoue | |
| 2019/0139673 A1 | 5/2019 | Harai et al. | |
| 2019/0152195 A1 | 5/2019 | Inoue | |
| 2020/0172686 A1 * | 6/2020 | Inoue | H10K 50/846 |
| 2021/0261804 A1 | 8/2021 | Inoue | |

FOREIGN PATENT DOCUMENTS

| | | | |
|---|---|---|---|
| CN | 101805538 A | 8/2010 | |
| CN | 106062121 A | 10/2016 | |
| CN | 106221364 A | 12/2016 | |
| CN | 107141889 A | 9/2017 | |
| CN | 107189552 A | 9/2017 | |
| JP | H02133406 A | 5/1990 | |
| JP | H02305814 A | 12/1990 | |
| JP | H0372512 A | 3/1991 | |
| JP | H0374409 A | 3/1991 | |
| JP | 2003317933 A | 11/2003 | |
| JP | 2004002501 A | 1/2004 | |
| JP | 2005015672 A | * | 1/2005 |
| JP | 2005200622 A | * | 7/2005 |

(Continued)

OTHER PUBLICATIONS

Machine translation of JP-2006272190-A (2006, 18 pages).*
Machine translation of JP-2008297494-A (2008, 33 pages).*
Machine translation of JP-2005015672-A (2005, 7 pages).*
Machine translation of JP 2003-317933 (2003, 12 pages).*
Machine translation of KR 20110054887 (2011, 8 pages).*
Machine translation of JP 2005-200622 (2005, 16 pages).*
Machine translation of WO 2014/091941 (2014, 25 pages).*
Jul. 30, 2019, International Search Report issued in the International Patent Application No. PCT/JP2019/017406.
Nov. 24, 2020, International Preliminary Report on Patentability issued in the International Patent Application No. PCT/JP2019/017406.
Oct. 16, 2023, Office Action issued by the United States Patent and Trademark Office in the U.S. Appl. No. 17/053,791.
Okabe—WO 2015-166657 A1—PCT D3—MT—sealing material—2015 (Year: 2015).

(Continued)

*Primary Examiner* — Brieann R Johnston
(74) *Attorney, Agent, or Firm* — KENJA IP LAW PC

(57) ABSTRACT

A resin solution for printing, including: a nonpolar solvent having a boiling point of 125° C. or higher; a thermoplastic elastomer; and a particle having a primary particle diameter of 1 nm or more and 200 nm or less, the resin solution having a viscosity of 1 cP or more and 50 cP or less. Preferably, the thermoplastic elastomer is a hydrogenated aromatic vinyl compound-conjugated diene block copolymer or a modified product of the hydrogenated aromatic vinyl compound-conjugated diene block copolymer with a silicon atom-containing polar group.

5 Claims, No Drawings

(56) References Cited

FOREIGN PATENT DOCUMENTS

| | | | | |
|---|---|---|---|---|
| JP | 2005298598 A | | 10/2005 | |
| JP | 2006272190 A | * | 10/2006 | |
| JP | 2008297494 A | * | 12/2008 | |
| JP | 2009259732 A | | 11/2009 | |
| JP | 2010138237 A | | 6/2010 | |
| JP | 2010140705 A | | 6/2010 | |
| JP | 2011198675 A | | 10/2011 | |
| JP | 2017513205 A | | 5/2017 | |
| JP | 2017117721 A | | 6/2017 | |
| JP | 2019059804 A | | 4/2019 | |
| JP | 2019534538 A | | 11/2019 | |
| KR | 20110054887 | * | 5/2011 | ............ G03F 7/027 |
| TW | 201546160 A | | 12/2015 | |
| TW | 201600544 A | | 1/2016 | |
| TW | 201716497 A | | 5/2017 | |
| TW | 201815572 A | | 5/2018 | |
| WO | WO-2014091941 A1 | * | 6/2014 | ............ C08F 297/04 |
| WO | 2015099079 A1 | | 7/2015 | |
| WO | 2015166657 A1 | | 11/2015 | |
| WO | 2017111138 A1 | | 6/2017 | |
| WO | 2018021031 A1 | | 2/2018 | |
| WO | WO-2018155311 A1 | * | 8/2018 | ......... A61B 17/0682 |
| WO | WO-2019044108 A1 | * | 3/2019 | ............ B32B 27/08 |

OTHER PUBLICATIONS

Sep. 1, 2023, Office Action issued by the United States Patent and Trademark Office in the U.S. Appl. No. 17/053,791.

Tayanagi—JP2003-317933 A—Jap.Ref.D1—MT—organic electroluminescent component—2003 (Year: 2003).

Thermo Fisher—Solvents—Polar and non-polar—Oct. 10, 2023 (Year: 2023).

Sep. 1, 2020, International Search Report issued in the International Patent Application No. PCT/JP2020/021709.

Dec. 14, 2021, International Preliminary Report on Patentability issued in the International Patent Application No. PCT/JP2020/021709.

* cited by examiner

RESIN SOLUTION FOR PRINTING

FIELD

The present invention relates to a resin solution for printing.

BACKGROUND

As a printing process, an ink jet printing method is known. As an ink composition usable in the ink jet printing method, for example, a composition containing a resin emulsion and water is known (Patent Literature 1).

CITATION LIST

Patent Literature

Patent Literature 1: Japanese Patent Application Laid-Open No. 2019-059804 A

SUMMARY

Technical Problem

The composition for printing such as an ink may contain particles having a certain function so that the layer obtained by printing can achieve a desired function.

In an ink jet printing method, pattern formation can be easily performed, and the amount of the composition for coating may be smaller than that in coating methods such as a bar-coating method and a spin-coating method. Therefore, it is desired to adapt the ink jet printing method to a process of producing an electronic element.

However, when a prior art composition for ink jet printing contains particles, the particles may deteriorate due to interactions with the solvent, depending on the type of material used in the particles, and desired functions of the particles may not be achieved. Furthermore, when an aqueous composition for ink jet printing or an organic solvent-based composition for ink jet printing in prior art is applied onto an electronic material, the function of the electronic material may be changed.

Furthermore, when a composition for printing containing an organic solvent is used in an ink jet printing method, nozzles may become clogged.

In light of these problems, there is a demand for a resin solution for printing that can be applied by an ink jet printing method, that has a low tendency to cause significant deterioration of an electronic material, and that contains an organic solvent.

Solution to Problem

The present inventor has intensively studied to solve the aforementioned problems. As a result, the inventor has found that the aforementioned problems can be solved by a resin solution for printing that contains a certain nonpolar solvent, a thermoplastic elastomer, and certain particles, and has a viscosity within a certain range. Thus, the present invention has been completed.

That is, the present invention provides as follows.

<1> A resin solution for printing, comprising: a nonpolar solvent having a boiling point of 125° C. or higher; a thermoplastic elastomer; and a particle having a primary particle diameter of 1 nm or more and 200 nm or less, the resin solution having a viscosity of 1 cP or more and 50 cP or less.

<2> The resin solution for printing according to <1>, wherein
the thermoplastic elastomer is
a hydrogenated aromatic vinyl compound-conjugated diene block copolymer or
a modified product of the hydrogenated aromatic vinyl compound-conjugated diene block copolymer with a silicon atom-containing polar group.

<3> The resin solution for printing according to <1> or <2>, wherein the particle absorbs or reflects light with a wavelength contained in at least a portion of a wavelength region of 350 nm or more and 1,500 nm or less.

<4> The resin solution for printing according to any one of <1> to <3>, wherein the particle contains a titanium black particle.

<5> The resin solution for printing according to any one of <1> to <3>, wherein the particle contains a high resistance black pigment particle.

<6> The resin solution for printing according to any one of <1> to <5>, wherein the nonpolar solvent contains at least one selected from the group consisting of decahydronaphthalene, dodecane, tridecane, cyclododecane, and tetradecane.

<7> The resin solution for printing according to any one of <1> to <6>, further comprising a dispersant soluble in the nonpolar solvent.

Advantageous Effects of Invention

The present invention can provide a resin solution for printing that can be applied by an ink jet printing method, that has a low tendency to cause significant deterioration of an electronic material, and that contains an organic solvent.

DESCRIPTION OF EMBODIMENTS

Hereinafter, the present invention will be described in detail with reference to embodiments and examples. However, the present invention is not limited to the embodiments and examples described hereinafter, and may be freely modified for implementation without departing from the scope of claims of the present invention and the scope of their equivalents.

In the following description, unless otherwise specified, "(meth)acryl-" is a term that includes "acryl-", "methacryl-" and a combination thereof. For example, "(meth)acrylic acid alkyl ester" means an acrylic acid alkyl ester, a methacrylic acid alkyl ester, or a mixture thereof.

In the following description, a substance indicated by the term "solvent" includes not only a medium in a solution, but also a dispersion medium in which a solid matter is dispersed for the sake of convenience of the description.

(1. Summary of Resin Solution for Printing)

The resin solution for printing according to an embodiment of the present invention contains a nonpolar solvent having a boiling point of 125° C. or higher, a thermoplastic elastomer, and a particle having a primary particle diameter of 1 nm or more and 200 nm or less. This resin solution has a viscosity of 1 cP or more and 50 cP or less.

(1.1. Nonpolar Solvent)

The resin solution for printing of the present embodiment contains a nonpolar solvent having a specific boiling point.

The boiling point of the nonpolar solvent is usually 125° C. or higher, preferably 150° C. or higher, and more preferably 175° C. or higher.

When the resin solution for printing that contains a nonpolar solvent having a boiling point that is equal to or higher than the aforementioned lower limit value is applied by an inkjet printing method, occurrence of nozzle clogging due to solidified deposits in the nozzles can be reduced.

The boiling point of the nonpolar solvent is preferably 300° C. or lower, and more preferably 250° C. or lower. When the resin solution for printing contains a nonpolar solvent having a boiling point that is equal to or lower than the aforementioned upper limit value, the resin solution for printing can be easily dried.

Examples of substances constituting such nonpolar solvents having a boiling point of 125° C. or higher may include substances which are liquid at normal temperature (preferably 25° C.) other than water and an inorganic substance. More specific examples thereof may include hydrocarbon solvents having a boiling point of 125° C. or higher. Still more specific examples thereof may include ethylcyclohexane, xylene, decahydronaphthalene, tetrahydronaphthalene, trimethylbenzene, cyclooctane, cyclodecane, octane (e.g., normal octane), dodecane, tridecane, tetradecane, and cyclododecane.

From the viewpoint of high solubility of the thermoplastic elastomer, the nonpolar solvent preferably contains at least one selected from the group consisting of decahydronaphthalene, dodecane, tridecane, cyclododecane, and tetradecane.

The ratio of the total weight of decahydronaphthalene, dodecane, tridecane, cyclododecane, and tetradecane in the total weight of the nonpolar solvent having a boiling point of 125° C. or higher, contained in the resin solution for printing, is preferably 50% by weight or more, more preferably 70% by weight or more, and still more preferably 80% by weight or more, and is usually 100% by weight or less.

In addition to the nonpolar solvent having a boiling point of 125° C. or higher, the resin solution for printing may contain a nonpolar solvent having a boiling point of lower than 125° C., as long as the effect of the present invention is not significantly impaired. The weight ratio of the nonpolar solvent having a boiling point of 125° C. or higher is preferably 50% by weight or more, more preferably 70% by weight or more, and still more preferably 80% by weight or more, and is usually 100% by weight or less, and may be 100% by weight, relative to the total weight of the nonpolar solvent contained in the resin solution for printing.

In addition to the nonpolar solvent, the resin solution for printing may contain, for example, a polar solvent which can be well compatible with the nonpolar solvent as long as the effect of the present invention is not significantly impaired. More specifically, a substance that is used as a polar solvent such as N,N-dimethylformamide or tetrahydrofuran may be contained. The ratio of the nonpolar solvent in the total of the nonpolar solvent and the polar solvent is preferably 95% by weight or more, more preferably 99% by weight or more, still more preferably 99.9% by weight or more, and ideally 100% by weight, for therewith materials across a wide range including an electronic material can be selected as an object to be coated with a resin solution for printing.

Although the resin solution for printing may contain water, the weight ratio of water in the resin solution for printing is preferably 1% by weight or less, more preferably 0.1% by weight or less, and still more preferably 0.01% by weight or less, and is usually 0% by weight or more, and may be 0% by weight, for therewith materials across a wide range including an electronic material can be selected as an object to be coated with the resin solution for printing.

(1.2. Thermoplastic Elastomer)

The thermoplastic elastomer refers to a material which exhibits characteristics of rubber at normal temperature and is plasticized at high temperatures to become a moldable material. Such thermoplastic elastomers have characteristics of being not prone to elongation or fracture under low force loads. Specifically, such a thermoplastic elastomer exhibits a Young's modulus of 0.001 to 1 GPa and a tensile elongation (elongation at break) of 100 to 1000% at 23° C. The thermoplastic elastomer also softens in the high temperature range of 40° C. or higher and 200° C. or lower while the storage elastic modulus drops sharply and the loss tangent tan δ (loss elastic modulus/storage elastic modulus) has a peak or has a value exceeding 1. The Young's modulus and tensile elongation may be measured in accordance with JIS K7113. The loss tangent tan δ may be measured by a commercially available dynamic viscoelasticity measuring device.

Thermoplastic elastomers have an advantage of low outgas because they generally contain no or little amount of residual solvent, and also have another advantage that the printing process may be simplified without crosslinking treatment or the like.

The resin solution for printing of the present embodiment contains a thermoplastic elastomer.

In the resin solution for printing, such a thermoplastic elastomer is usually present in a dissolved state. In the resin solution for printing, the thermoplastic elastomer may be present as a dissolved solid content. The solid content in the resin solution for printing is a component other than a solvent, and usually includes all the components that will remain after the resin solution for printing is dried and the solvent is volatilized.

As the thermoplastic elastomer, a polymer may be used. Examples of the polymer which may be used as the thermoplastic elastomer may include an ethylene-α-olefin copolymer such as an ethylene-propylene copolymer; an ethylene-α-olefin-polyene copolymer; a copolymer of ethylene with an unsaturated carboxylic acid ester such as ethylene-methyl methacrylate and ethylene-butyl acrylate; a copolymer of ethylene with a fatty acid vinyl ester such as ethylene-vinyl acetate; a polymer of an acrylic acid alkyl ester such as ethyl acrylate, butyl acrylate, hexyl acrylate, 2-ethylhexyl acrylate, and lauryl acrylate; a diene-based copolymer such as polybutadiene, polyisoprene, an acrylonitrile-butadiene copolymer, a butadiene-isoprene copolymer, a butadiene-(meta)acrylic acid alkyl ester copolymer, a butadiene-(meta)acrylic acid alkyl ester-acrylonitrile copolymer, and a butadiene-(meta)acrylic acid alkyl ester-acrylonitrile-styrene copolymer; a butylene-isoprene copolymer; an aromatic vinyl compound-conjugated diene copolymer such as a styrene-butadiene random copolymer, a styrene-isoprene random copolymer, a styrene-butadiene block copolymer, a styrene-butadiene-styrene block copolymer, a styrene-isoprene block copolymer, and a styrene-isoprene-styrene block copolymer; a hydrogenated aromatic vinyl compound-conjugated diene copolymer such as a hydrogenated styrene-butadiene random copolymer, a hydrogenated styrene-isoprene random copolymer, a hydrogenated styrene-butadiene block copolymer, a hydrogenated styrene-butadiene-styrene block copolymer, a hydrogenated styrene-isoprene block copolymer, and a hydrogenated styrene-isoprene-styrene block copolymer; a low crystallizable polybutadiene; a styrene graft ethylene-propylene elastomer; a thermoplastic polyester elastomer; an ethylenic ionomer; and modified products of these polymers with a silicon atom-containing polar group.

As the polymers, one type thereof may be solely used, and two or more types thereof may also be used in combination.

As the thermoplastic elastomer, a hydrogenated aromatic vinyl compound-conjugated diene block copolymer or a modified product of a hydrogenated aromatic vinyl compound-conjugated diene block copolymer with a silicon atom-containing polar group is preferred for obtaining a desired effect of the present invention.

The hydrogenated aromatic vinyl compound-conjugated diene block copolymer is a hydrogenated product of an aromatic vinyl compound-conjugated diene block copolymer. In other words, the hydrogenated aromatic vinyl compound-conjugated diene block copolymer has a structure obtained by entirely or partly hydrogenating a carbon-carbon unsaturated bond of a main chain and a side chain of an aromatic vinyl compound-conjugated diene block copolymer, a carbon-carbon unsaturated bond of the aromatic ring thereof, or both. However, the hydrogenated product used in the present application is not limited by production methods thereof.

As the aromatic vinyl compound, styrene and a derivative thereof; and vinylnaphthalene and a derivative thereof are preferable. In consideration of industrial availability, styrene is particularly preferably used. As the conjugated diene, a chain conjugated diene (linear conjugated diene and branched conjugated diene) is preferable. Specific examples thereof may include 1,3-butadiene, isoprene (2-methyl-1,3-butadiene), 2,3-dimethyl-1,3-butadiene, and 1,3-pentadiene. Among these, 1,3-butadiene and isoprene are particularly preferable because of their industrial availability.

The aromatic vinyl compound-conjugated diene block copolymer is preferably selected from a styrene-butadiene block copolymer, a styrene-butadiene-styrene block copolymer, a styrene-isoprene block copolymer, a styrene-isoprene-styrene block copolymer, and a mixture thereof. More specific examples thereof may include those described in prior art literatures such as Japanese Patent Application Laid-Open No. Hei. 2-133406 A, Japanese Patent Application Laid-Open No. Hei. 2-305814 A, Japanese Patent Application Laid-Open No. Hei. 3-72512 A, Japanese Patent Application Laid-Open No. Hei. 3-74409 A, and International Publication No. 2015/099079.

The hydrogenation rate of the hydrogenated aromatic vinyl compound-conjugated diene block copolymer is preferably 90% or more, more preferably 97% or more, and particularly preferably 99% or more. The higher the hydrogenation rate is, the more the heat resistance and light resistance of the layer formed by the resin solution for printing are improved. Herein, the hydrogenation rate of the hydrogenated product may be obtained by the measurement by $^1$H-NMR.

The hydrogenation rate of the carbon-carbon unsaturated bonds of the main chain and the side chain of the hydrogenated aromatic vinyl compound-conjugated diene block copolymer is preferably 95% or more, and more preferably 99% or more. By increasing the hydrogenation rate of the carbon-carbon unsaturated bonds of the main chain and the side chain of the hydrogenated aromatic vinyl compound-conjugated diene block copolymer, light resistance and oxidation resistance of the layer formed by the resin solution for printing can be further enhanced.

The hydrogenation rate of the carbon-carbon unsaturated bond of the aromatic ring of the hydrogenated aromatic vinyl compound-conjugated diene block copolymer is preferably 90% or more, more preferably 93% or more, and particularly preferably 95% or more. Elevation of the hydrogenation rate of the carbon-carbon unsaturated bond of the aromatic ring can increase the glass transition temperature of the hydrogenated product, and thereby can effectively enhance heat resistance of the layer formed by the resin solution for printing. Further, elevation of the hydrogenation rate can reduce photoelastic coefficient of the layer formed by the resin solution for printing, and thereby can suppress expression of retardation.

The hydrogenated aromatic vinyl compound-conjugated diene block copolymer preferably has a structure obtained by hydrogenating both the unsaturated bonds derived from a conjugated diene and the aromatic ring.

Particularly preferable forms of the blocks of the hydrogenated aromatic vinyl compound-conjugated diene block copolymer may include a triblock copolymer in which blocks (A) of an aromatic vinyl polymer hydrogenated product are bonded to both ends of a block (B) of a conjugated diene polymer hydrogenated product; and a pentablock copolymer in which polymer blocks (B) are bonded to both ends of a polymer block (A) and polymer blocks (A) are further bonded to respective other ends of both the polymer blocks (B). In particular, the triblock copolymer of (A)-(B)-(A) is particularly preferable because it can be easily produced and properties thereof as a thermoplastic elastomer can be easily controlled to fall within desired ranges.

When the weight fraction occupied by the total aromatic vinyl monomer units in the entire block copolymer is defined as wA and the weight fraction occupied by the total conjugated diene monomer units in the entire block copolymer is defined as wB, the ratio (wA:wB) of wA relative to wB is preferably 20/80 or more, and more preferably 30/70 or more, and is preferably 60/40 or less, and more preferably 55/45 or less. By setting the ratio wA/wB described above to a value equal to or higher than the lower limit value of the range, heat resistance of the layer formed by the resin solution for printing can be improved. By setting the ratio to a value equal to or lower than the upper limit value, flexibility of the layer formed by the resin solution for printing can be enhanced. Further, thereby the glass transition temperature of the block copolymer can be lowered and accordingly the sealing temperature can be lowered. That can lead to suppression of thermal degradation of the element upon applying the resin solution for printing of the present embodiment to the sealing of an electronic element such as an organic electroluminescence element or an organic semiconductor element. By setting the ratio (wA/wB) within the aforementioned range, the temperature range within which a layer formed by the resin solution for printing acquires rubber elasticity can be widened, and a temperature range within which a device or the like obtained by applying the resin solution for printing acquires flexibility can be widened.

The thermoplastic elastomer may be a modified product of a polymer, exemplified as a polymer which can be used as a thermoplastic elastomer, with a silicon atom-containing polar group. By using a modified product of the polymer with a silicon atom-containing polar group as a thermoplastic elastomer, adhesion between a layer formed from the resin solution for printing and an object to be printed can be improved.

Hereinafter, a polymer used in a reaction for obtaining a modified product is also referred to as a pre-reaction polymer. The modified product has a structure that is, e.g., a structure obtained by graft polymerization of a pre-reaction polymer and a compound having a silicon atom-containing polar group as a monomer.

However, the modified product is not limited by the production method thereof.

The silicon atom-containing polar group is preferably an alkoxysilyl group.

Examples of the compound having a silicon atom-containing polar group that may be used as a monomer for graft polymerization may include an ethylenically unsaturated silane compound having an alkoxysilyl group such as vinyltrimethoxysilane, vinyltriethoxysilane, allyltrimethoxysilane, allyltriethoxysilane, dimethoxymethylvinylsilane, diethoxymethylvinylsilane, p-styryltrimethoxysilane, p-styryltriethoxysilane, 3-methacryloxypropyltrimethoxysilane, 3-methacryloxypropylmethyldimethoxysilane, 3-methacryloxypropyltriethoxysilane, 3-methacryloxypropylmethyldiethoxysilane, 3-acryloxypropyltrimethoxysilane, 3-acryloxypropyltriethoxysilane, and 2-norbornen-5-yltrimethoxysilane.

By reacting the pre-reaction polymer with a compound having a silicon atom-containing polar group, the silicon atom-containing polar group can be introduced into the pre-reaction polymer to obtain a modified product having the silicon atom-containing polar group. When an alkoxysilyl group is introduced as a silicon atom-containing polar group, the amount of the alkoxysilyl group to be introduced is preferably 0.1 part by weight or more, more preferably 0.2 part by weight or more, and still more preferably 0.3 part by weight or more, and is preferably 10 parts by weight or less, more preferably 5 parts by weight or less, and still more preferably 3 parts by weight or less, relative to 100 parts by weight of the pre-reaction polymer. When the amount of the alkoxysilyl group to be introduced falls within the aforementioned range, it is possible to prevent the degree of crosslinking between the alkoxysilyl groups decomposed by moisture or the like from becoming excessively high, so that it is possible to maintain high adhesion. Examples of the substance having an alkoxysilyl group used for introduction of the alkoxysilyl group and the modification method may include those described in prior art literatures such as International Publication No. 2015/099079.

The introduction amount of the polar group may be measured by a $^1$H-NMR spectrometry. When the introduction amount of the polar group to be measured is small, the number of times of integration may be increased to measure the introduction amount.

The introduction of an alkoxysilyl group as a polar group into the pre-reaction polymer is referred to as silane modification. In the silane modification, an alkoxysilyl group may be directly bonded to the pre-reaction polymer, and may be bonded via a divalent organic group such as an alkylene group, for example. Hereinafter, a polymer obtained by silane modification of a pre-reaction polymer is also referred to as a "silane modified product".

The modified product of a pre-reaction polymer with a silicon atom-containing polar group is preferably a silane modified product of a hydrogenated aromatic vinyl compound-conjugated diene block copolymer, and is preferably one or more types of silane modified products selected from a silane modified product of a hydrogenated styrene-butadiene block copolymer, a silane modified product of a hydrogenated styrene-butadiene-styrene block copolymer, a silane modified product of a hydrogenated styrene-isoprene block copolymer, and a silane modified product of a hydrogenated styrene-isoprene-styrene block copolymer.

The weight-average molecular weight (Mw) of the thermoplastic elastomer is not particularly limited, and is preferably 20,000 or more, more preferably 30,000 or more, and still more preferably 35,000 or more, and is preferably 200,000 or less, more preferably 100,000 or less, and still more preferably 70,000 or less. The weight-average molecular weight of the thermoplastic elastomer may be measured as a polystyrene-equivalent value by a gel permeation chromatography using tetrahydrofuran as a solvent. The molecular weight distribution (Mw/Mn) of the thermoplastic elastomer is preferably 4 or less, more preferably 3 or less, and still more preferably 2 or less, and is preferably 1 or more. By setting the weight-average molecular weight Mw and the molecular weight distribution Mw/Mn of the thermoplastic elastomer within the aforementioned ranges, mechanical strength and heat resistance of a layer formed by the resin solution for printing can be improved.

The glass transition temperature of the thermoplastic elastomer is not particularly limited, and is preferably 40° C. or higher, and more preferably 70° C. or higher, and is preferably 200° C. or lower, more preferably 180° C. or lower, and still more preferably 160° C. or lower. When a material containing a block copolymer is used as the thermoplastic elastomer, by adjusting the glass transition temperature by changing the weight ratios of the respective polymer blocks, adhesiveness and flexibility of a layer formed by the resin solution for printing can be balanced.

The ratio of the thermoplastic elastomer in the resin solution for printing of the present embodiment is not particularly limited, and may be appropriately adjusted within a range in which desired properties are achieved. Specifically, the ratio of the thermoplastic elastomer in the total amount of the resin solution for printing is preferably 1% by weight or more, and more preferably 3% by weight or more, and is preferably 40% by weight or less, more preferably 30% by weight or less, and still more preferably 20% by weight or less.

(1.3. Particle)

The resin solution for printing of the present embodiment contains particles having a primary particle diameter of 1 nm or more and 200 nm or less. In the present application, the primary particle diameter usually represents the number-average particle diameter of primary particles. The number-average particle diameter of primary particles may be measured with a laser diffraction particle size analyzer.

When the number-average particle diameter of primary particles measured with the laser diffraction particle size analyzer is less than 40 nm, the number-average particle diameter of primary particles may be suitably measured with a particle diameter measuring device based on a dynamic light scattering method. The measurement by the dynamic light scattering method may be performed in a state of a dispersion liquid in which the particles are dispersed in a solvent.

When the number-average particle diameter of primary particles measured with the laser diffraction particle size analyzer is less than 40 nm or when the number-average particle diameter cannot be measured by a laser diffraction method and a dynamic light scattering method, the average particle diameter may be suitably obtained by observation with an electron microscope. Specifically, the average particle diameter may be calculated by the following method. First, the effective particle diameter is obtained by summing a short axis and a long axis of a primary particle and dividing by 2 for each of 50 particles observed with an electron microscope. Second, the arithmetic average of effective particle diameter of 50 particles is calculated to obtain the average particle diameter. When the average particle diameter is obtained by observation with an electron microscope, a film may be formed from the resin solution for printing, and the particles in a cross section of the film may be observed.

In the resin solution for printing, the particles are in a dispersed state. The primary particle diameter of the particles is usually 1 nm or more, and more preferably 5 nm or more, and usually 200 nm or less, and preferably 150 nm or less. When the primary particle diameter of the particles is equal to or more than the aforementioned lower limit value, aggregation and/or deterioration of the particles in the resin solution for printing can be suppressed.

When the primary particle diameter of the particles is equal to or less than the aforementioned upper limit value, the resin solution for printing can exhibit appropriate flowability. Therefore, when the resin solution for printing is used in an ink jet printing method, the resin solution for printing can be discharged from nozzles at an appropriate time point without nozzle clogging.

As the particles, particles having a desired function may be used. For example, particles that absorb or reflect light with a wavelength contained in at least a portion of a wavelength region of 350 nm or more and 1,500 nm or less may be used.

The occurrence of absorption or reflection of light by the particles with a wavelength contained in at least a portion of a wavelength region of 350 nm or more and 1,500 nm or less may be confirmed by the following method.

A resin solution for printing 1 containing particles is prepared, and a resin layer 1 containing the particles is prepared on a glass plate.

A resin solution for printing C1 is prepared by the same preparation method as the method for preparing the resin solution for printing 1 except that particles are not added, and a resin layer C1 not containing the particles is prepared on a glass plate.

The light transmittances of the resin layers 1 and C1 using light with a wavelength contained in at least a portion of a wavelength region of 350 nm or more and 1,500 nm or less are measured.

As a result of the measurement of light transmittances, when there is light with a wavelength in which the light transmittance of the resin layer 1 is smaller than the light transmittance of the resin layer C1, it can be confirmed that the particles absorb or reflect the light with a wavelength contained in at least a portion of a wavelength region of 350 nm or more and 1,500 nm or less.

Examples of the particles may include, but are not particularly limited to, particles of an organic pigment, particles of an inorganic pigment, carbon black, particles of publicly known infrared light absorbing material, and quantum dot particles. As the particles, one type thereof may be solely used, and two or more types thereof may also be used in combination.

Specific examples of the organic pigment may include an azo pigment, a phthalocyanine pigment, and a polycyclic pigment.

Specific examples of the inorganic pigment may include titanium dioxide, magnesium oxide, barium sulfate, zirconium oxide, zinc oxide, iron oxide, cadmium sulfide, titanium nickel antimony oxide, titanium nickel barium oxide, strontium chromate, viridian, chromium oxide, cobalt aluminate, titanium nitride, cobalt oxide, magnetite, low order titanium oxide, titanium oxynitride (titanium black), and high resistance black pigment.

Examples of the high resistance black pigment may include a pigment containing titanium black and an insulating pigment containing at least one selected from the group consisting of $Y_2O_3$, $ZrO_2$, $Al_2O_3$, $SiO_2$, $TiO_2$, and $V_2O_5$; and a pigment containing a black pigment, containing titanium black, and an insulating pigment, containing at least one selected from the group consisting of $Y_2O_3$, $ZrO_2$, $Al_2O_3$, $SiO_2$, $TiO_2$, and $V_2O_5$.

It is preferable that the high resistance black pigment has an insulating property such that when the high resistance black pigment is added to a resin solution for printing and a resin layer having a thickness of 1 μm is formed from the resin solution for printing, the surface resistance value of the resin layer is equal to or higher than $10^{13}$ Ω/sq.

Specific examples of the infrared absorbing material may include lanthanum hexaboride, cesium tungsten oxide, indium tin oxide (ITO), and antimony tin oxide (ATO).

Specific examples of materials included in quantum dot particles may include InP/ZnS, CdSe/ZnS, CdSeS/ZnS, and $CsPbX_3$ (X=Cl, Br, or I).

The weight ratio of the particles having a primary particle diameter of 1 nm or more and 200 nm or less in the total amount of the resin solution for printing may be appropriately adjusted to satisfy desired characteristics of the resin solution for printing, and is preferably 0.1% by weight or more, more preferably 0.3% by weight or more, still more preferably 0.8% by weight or more, and particularly preferably 1% by weight or more, and is preferably 15% by weight or less, more preferably 10% by weight or less, and still more preferably 5% by weight or less.

The weight ratio of the particles having a primary particle diameter of 1 nm or more and 200 nm or less in the resin solution for printing is preferably 1% by weight or more, and more preferably 3% by weight or more, and is preferably 80% by weight or less, more preferably 60% by weight or less, still more preferably 40% by weight or less, and particularly preferably 30% by weight or less, relative to the total amount of solid contents.

When the weight ratio of the particles having the primary particle diameter of 1 nm or more and 200 nm or less is equal to or more than the aforementioned lower limit value, a desired function of the particles (for example, a light shielding effect) can be effectively exhibited. When the weight ratio of the particles is equal to or lower than the upper limit value, transparency of the layer formed from the resin solution for printing can be increased.

(1.4. Optional Components)

In addition to the nonpolar solvent, thermoplastic elastomer, and particles described above, the resin solution for printing of the present embodiment may contain optional components as long as the effects of the present invention are not significantly impaired.

Examples of the optional component may include an antioxidant; a plasticizer; a dispersant; a ultraviolet absorber; a lubricant; and an inorganic filler. As the optional components, one type thereof may be solely used, and two or more types thereof may also be used in combination at any ratio.

Examples of the antioxidant may include a phosphorus-based antioxidant, a phenol-based antioxidant, and a sulfur-based antioxidant, and a phosphorus-based antioxidant is preferable because of its low tendency to cause coloration.

Examples of the phosphorus-based antioxidant may include monophosphite compounds such as triphenylphosphite, diphenylisodecyl phosphite, phenyldiisodecyl phosphite, tris(nonylphenyl) phosphite, tris(dinonylphenyl) phosphite, tris(2,4-di-t-butylphenyl) phosphite, and 10-(3,5- di-t-butyl-4-hydroxybenzyl)-9,10-dihydro-9-oxa-10-phosphaphenanthrene-10-oxide; diphosphite compounds such as 4,4'-butylidene-bis(3-methyl-6-t-butylphenyl-di-tridecyl phosphite) and 4,4'-isopropylidene-bis(phenyl-di-alkyl(C12 to C15) phosphite); and compounds such as 6-(3-(3-t-butyl-4-hydroxy-5-methylphenyl)propoxy)-2,4,8,10-tetrakis-t-butyldibenzo(d,f) (1.3.2)dioxaphosphepine, and 6-(3-(3,5-di-t-butyl-4-hydroxyphenyl)propoxy)-2,4,8,10-tetrakis-t-butyldibenzo(d,f) (1.3.2)dioxaphosphepine.

The amount of the antioxidant is preferably 0.01 part by weight or more, more preferably 0.05 part by weight or more, and still more preferably 0.1 part by weight or more, and is preferably 1 part by weight or less, more preferably 0.5 part by weight or less, and still more preferably 0.3 part by weight or less, relative to 100 parts by weight of the thermoplastic elastomer. By using an antioxidant in an amount of the lower limit value or more of the aforementioned range, durability of a layer formed from the resin solution for printing can be improved. By using an antioxidant in an amount of the upper limit value or less of the aforementioned range, durability can be efficiently improved.

Suitable examples of the plasticizer may include a hydrocarbon-based oligomer; an organic acid ester-based plasticizer such as a monobasic organic acid ester and a polybasic organic acid ester; a phosphoric acid ester-based plasticizer such as an organophosphoric acid ester-based plasticizer and an organophosphorous acid ester-based plasticizer; and combinations thereof.

The dispersant has a function of improving dispersibility of particles in the resin solution for printing.

Examples of the dispersant may include a dispersant that is soluble in a nonpolar solvent. In the present invention, the dispersant is preferably soluble in the nonpolar solvent having a boiling point of 125° C. or higher, and more preferably soluble in decahydronaphthalene, dodecane, tridecane, cyclododecane, and tetradecane. In this specification, "soluble in a nonpolar solvent" means that it dissolves in an amount of 5% by weight or more relative to a nonpolar solvent. A test for determining whether the dispersant is soluble in a nonpolar solvent or not may be performed at a temperature at which respective components contained in the resin solution for printing are mixed to prepare the resin solution for printing. A temperature condition for such a test is usually normal temperature (5° C. to 35° C.), preferably 25° C. In such a temperature condition, if 5% by weight or more of the dispersant relative to the nonpolar solvent dissolves without leaving a precipitate of solids, it may be determined that the dispersant is soluble in the nonpolar solvent. As a nonpolar solvent used in such a test, various nonpolar solvents which are used in the production of the thermoplastic elastomer and which can dissolve the thermoplastic elastomer can be used. When soluble in any of these various nonpolar solvents, it can be determined that the dispersant is soluble in a nonpolar solvent.

Examples of the dispersant that is soluble in a nonpolar solvent may include: a 12-hydroxystearic acid oligomer; and commercially available dispersants such as "Aron" (registered trademark) and "Jurimer" (registered trademark) series of TOAGOSEI Co., Ltd., "Aqualic" (registered trademark) series of Nippon Shokubai Co., Ltd., "Flowlen" (registered trademark) series of Kyoeisha Chemical Co., Ltd., "Disparlon" (registered trademark) series of Kusumoto Chemicals Ltd., "Sokalan" (registered trademark) series and "EFKA" series of BASF, "DISPERBYK" (registered trademark) series and "Anti-Terra" series of BYK Chemie, "SOL-SPERSE" (registered trademark) series of Nippon Lubrizol Co., Ltd., and "AJISPER" series of Ajinomoto Fine-Techno Co., Inc.

(1.5. Viscosity of Resin Solution for Printing)

The viscosity of the resin solution for printing of the present embodiment is usually 1 cP or more, preferably 2 cP or more, and more preferably 3 cP or more, and is usually 50 cP or less, preferably 30 cP or less, and more preferably 20 cP or less.

When the viscosity of the resin solution for printing is equal to or more than the aforementioned lower limit value, the thickness of a layer formed from the resin solution for printing can be increased.

When the viscosity of the resin solution for printing is equal to or less than the aforementioned upper limit value, the resin solution for printing can be discharged from nozzles at an appropriate time during use of the resin solution for printing in an ink jet printing method.

The viscosity of the resin solution for printing may be measured with a tuning fork-type vibration viscometer in an environment of 25° C.±2° C.

(2. Application of Resin Solution for Printing)

The resin solution for printing of the present embodiment is used in various types of printing methods, and therewith a resin layer may be formed. The resin layer may be a layer with a pattern shape according to intended use. Examples of the printing method may include a relief printing method, an intaglio printing method (for example, a gravure printing method), a screen printing method, and an ink jet printing method. In the present application, the printing method includes a method that does not use a printing plate, such as an ink jet printing method.

By using the resin solution for printing of the present embodiment, nozzle clogging of a printer head can be suppressed. Therefore, the resin solution for printing can be suitably used, in particular, in an ink jet printing method.

The process of the ink jet printing method is not particularly limited, and may be a thermal process in which the resin solution for printing is discharged from tips of nozzles by generating air bubbles in the nozzles under heating, or a piezo process in which the resin solution for printing is discharged from tips of nozzles by deformation of a piezo element.

In particular, the resin solution for printing of the present embodiment may be suitably used in an ink jet printing method adopting a piezo process.

Since the resin solution for printing of the present embodiment has low tendency to cause deterioration of an electronic material such as an organic electronic material, the resin solution for printing can be suitably used to form a resin layer on a subject such as a metal such as aluminum, copper, and silver, a light emitting diode (LED) (e.g., an organic electroluminescent element, a micro LED, and a mini LED), an electroconductive layer (e.g., an organic transparent electroconductive film), and the like.

The resin solution for printing of the present embodiment can impart properties according to the function of the contained particles to the resin layer. For example, when particles that absorb or reflect infrared light are used, an infrared light shielding function can be imparted to the resin layer. When pigment particles are used as the particles, the resin layer can be used as, for example, a color filter of an image display element.

EXAMPLES

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operation described below was performed under the conditions of normal temperature and normal pressure, unless otherwise specified.

(Evaluation Method)

(Young's Modulus, Tensile Elongation, and Tan δ of Resin)

The Young's modulus and the tensile elongation of a resin at 23° C. were measured in accordance with JIS K7113. A film of the resin was formed. The film was cut out to obtain a test piece with a width of 10 mm and a length of 20 mm. Therewith the loss tangent tan δ (loss elastic modulus/storage elastic modulus) of the resin was measured at 40° C. or higher and 200° C. or lower with a dynamic viscoelasticity measuring device DMS6100 manufactured by Hitachi High-Tech Science Corporation.

(Viscosity of Resin Solution for Printing)

The viscosity of the resin solution for printing was measured by the following method.

As the measuring device, a tuning fork-type vibration viscometer SV-10 manufactured by A&D Company, Limited was used. Initially, a sample container was filled with the resin solution so that the liquid level of the resin solution was between standard lines of the sample container. Then, an oscillator was inserted in the resin solution at a specific position, and then the viscosity was measured. The measurement was performed in an environment of 25° C.±2° C.

Production Example 1

(P1-1. Production of Hydrogenated Block Copolymer)

A hydrogenated product of a block copolymer (hydrogenated block copolymer) was produced using styrene as an aromatic vinyl compound and isoprene as a chain conjugated diene compound by the following procedure. The produced hydrogenated product of a block copolymer has a triblock structure in which a polymer blocks (A) are bonded to both ends of a polymer block (B).

Into a reaction vessel which was equipped with a stirrer and in which air was sufficiently replaced with nitrogen, 256 parts of dehydrated cyclohexane, 25.0 parts of dehydrated styrene, and 0.615 part of n-dibutyl ether were placed. While the mixture was stirred at 60° C., 1.35 parts of n-butyl lithium (a 15% cyclohexane solution) was added, to initiate polymerization. The reaction was maintained at 60° C. for 60 minutes with stirring. The polymerization conversion rate at this point was 99.5% (the polymerization conversion rate was measured by gas chromatography, and hereinafter the same applies).

Subsequently, 50.0 parts of dehydrated isoprene was added, and the mixture was continuously stirred at the same temperature for 30 minutes. The polymerization conversion rate at this point was 99%.

After that, 25.0 parts of dehydrated styrene was added, and the mixture was stirred at the same temperature for 60 minutes. The polymerization conversion rate at this point was almost 100%.

Subsequently, 0.5 part of isopropyl alcohol was added to the reaction liquid, to terminate the reaction. Thus, a solution (i) containing a block copolymer was obtained.

The weight-average molecular weight (Mw) of the block copolymer in the obtained solution (i) was 44,900, and the molecular weight distribution (Mw/Mn) thereof was 1.03 (these values were measured as polystyrene-equivalent values by gel permeation chromatography using tetrahydrofuran as a solvent, and hereinafter the same applies).

Subsequently, the solution (i) was transferred to a pressure-resistant reaction vessel equipped with a stirrer, 4.0 parts of a silica-alumina carried nickel catalyst (E22U, carried nickel amount 60%; manufactured by JGB Catalyst and Chemicals Ltd.) as a hydrogenation catalyst and 350 parts of dehydrated cyclohexane were added to the solution (i) and mixed. The inside of the reactor was replaced with a hydrogen gas, and hydrogen was further supplied while the solution was stirred. A hydrogenation reaction was performed at a temperature of 170° C. and a pressure of 4.5 MPa for 6 hours, to hydrogenate the block copolymer. As a result, a solution (iii) containing a hydrogenated product (ii) of the block copolymer was obtained. The weight-average molecular weight (Mw) of the hydrogenated product (ii) in the solution (iii) was 45,100, and the molecular weight distribution (Mw/Mn) thereof was 1.04.

After termination of the hydrogenation reaction, the solution (iii) was filtered to remove the hydrogenation catalyst. After that, to the filtered solution (iii), 1.0 part of a xylene solution in which 0.1 part of 6-(3-(3-t-butyl-4-hydroxy-5-methylphenyl)propoxy)-2,4,8,10-tetrakis-t-butyldibenzo(d, f) (1.3.2)dioxaphosphepin ("Sumilizer (registered trademark) GP" manufactured by Sumitomo Chemical Co., Ltd., hereinafter referred to as an "antioxidant A") as a phosphorus-based antioxidant was dissolved was added and dissolved, to obtain a solution (iv).

Subsequently, the solution (iv) was filtered through a Zeta Plus (registered trademark) filter 30H (manufactured by CUNO, Inc., pore diameter of 0.5 μm to 1 μm), and successively filtered through another metal fiber filter (manufactured by Nichidai Co., Ltd., pore diameter of 0.4 μm), to remove minute solid contents. From the filtered solution (iv), solvents cyclohexane and xylene, and other volatile components were removed at a temperature of 260° C. and a pressure of 0.001 MPa or less using a cylindrical concentrating and drying device (product name "Kontro", manufactured by Hitachi, Lid.). From a die directly connected to the aforementioned concentrating and drying device, the solid content in a molten state was extruded into a strand shape. The extruded product was cooled, and cut with a pelletizer, to obtain 85 parts of pellet (v) containing the hydrogenated product of the block copolymer and the antioxidant A. The weight-average molecular weight (Mw) of the hydrogenated product of the block copolymer (hydrogenated block copolymer) in the obtained pellet (v) was 45,000, and the molecular weight distribution (Mw/Mn) thereof was 1.08. The hydrogenation rate measured by $^1$H-NMR was 99.9%.

From the pellet (v), a test piece with a film shape was produced, and the glass transition temperature Tg of the test piece was evaluated by a tan δ peak of a dynamic viscoelasticity measuring device, and was found out to be 130° C. The peak value of tan δ of the pellet (v) at 40° C. or higher and 200° C. or lower was 1.4. The Young's modulus of the pellet (vi) at 23° C. was 0.6 GPa, and the tensile elongation thereof at 23° C. was 550%. Therefore, the obtained hydrogenated block copolymer was a thermoplastic elastomer.

Production Example 2

Using the pellet (v) of the hydrogenated product of the block copolymer (hydrogenated block copolymer) obtained in Production Example 1, a silane modified product of the hydrogenated block copolymer (modified product of the hydrogenated block copolymer with an alkoxysilyl group) was obtained.

(P2-1. Production of Silane Modified Product of Hydrogenated Block Copolymer)

To 100 parts of the pellet (v) obtained in Production Example 1 (P1-1), 2.0 parts of vinyltrimethoxysilane and 0.2 part of di-t-butyl peroxide were added to obtain a mixture. This mixture was kneaded using a twin-screw extruder at a barrel temperature of 210° C. and a residence time of 80 to 90 seconds. The kneaded mixture was extruded and cut with a pelletizer to obtain pellets (vi) of the silane modified product of the hydrogenated block copolymer. A film-shaped test piece was prepared from this pellet (vi), and the glass transition temperature Tg was evaluated by the tan δ peak of the dynamic viscoelasticity measuring device, and was found out to be 124° C. The peak value of tan δ of the pellet (vi) at 40° C. or higher and 200° C. or lower was 1.3. The Young's modulus of the pellet (vi) at 23° C. was 0.5 GPa, and the tensile elongation at 23° C. was 550%. Therefore, the obtained silane-modified product of the hydrogenated block copolymer was a thermoplastic elastomer.

The refractive index (n1) of the pellet (vi) measured by an Abbe refractometer was 1.50.

Example 1

(1-1. Preparation of Resin Solution for Printing)

To 11.5 parts of the silane modified product of the hydrogenated block copolymer (pellet (vi)) produced in Production Example 2, 103.5 parts of tridecane (boiling point of 234° C.) was added to dissolve the pellet (vi). Thus, a resin solution was obtained. To the obtained resin solution, 10 parts of a 10% ITO particle dispersion liquid, in which ITO particles were dispersed in toluene, was added. The ITO particles have a number-average particle diameter of the primary particles of 20 nm. The number-average particle diameter of the primary particles was measured by using a particle size distribution measuring device "Zetasizer Nano" (manufactured by Malvern Instruments) by a dynamic light scattering method while appropriately diluting the ITO particle dispersion liquid.

The primary particle diameter of the ITO particles before being dispersed in toluene was measured by observing the particles with a transmission electron microscope (TEM), and was found out to be 20 nm. Specifically, the primary particle diameter was measured by the following method. For each of 50 ITO particles, the sum of the short axis and the major axis of a primary particle was calculated. The arithmetic average of numerical values obtained by dividing the obtained sum by 2 was used as the primary particle diameter of the ITO particles.

As a result, a resin solution for printing D1 containing 8% ITO particles relative to the solid content was obtained.

As will be described later in (C1-3. Optical characteristics of resin layer) of Comparative Example 1, the ITO particles absorb or reflect light with a wavelength contained in at least a portion of the wavelength range of 350 nm or more and 1,500 nm or less.

The viscosity of the resin solution for printing D1 was 8 cP.

(1-2. Formation of Resin Layer)

The resin solution for printing D1 was applied onto a glass plate with an ink jet printer, to form a coating layer, and the coating layer was dried under conditions of 130° C. for 3 minutes, to form a resin layer with a thickness of 3 μm. In the application process with the ink jet printer, a good resin layer having no thickness unevenness was formed without nozzle clogging of the printer head.

(1-3. Optical Properties of Resin Layer)

The light transmittance of the resin layer formed on the glass plate was measured at a wavelength range of 800 nm or more to 2,000 nm with a spectrophotometer ("V-570" manufactured by JASCO Corporation). As a result, it was found that the resin layer showed light transmittances indicated below, and had sufficient light-shielding properties in the near infrared region.

800 nm: 78%
1,150 nm: 60%
1,500 nm: 16%
2,000 nm: 2.3%

The haze value of the resin layer was measured with a haze meter ("NDH4000" manufactured by Nippon Denshoku Industries Co., Ltd.), and was found out to be 0.8%.

(1-4. Change in Resistance Value of Transparent Electroconductive Layer)

A transparent electroconductive film-forming material ("AP2325" manufactured by Nanonics) containing a silver nanowire and polyethylenedioxythiophene (PEDOT) in a total amount of 2.5% was applied onto a polyethylene terephthalate (PET) substrate with a bar coater of #12, to obtain a coating layer. The coating layer was dried under the condition of 90° C. for 3 minutes, to obtain a film having a transparent electroconductive layer. The obtained film was cut out to obtain a square shaped test piece with an edge length of 50 mm. The resistance value between two adjacent corners among four corners of the test piece was measured, and was found out to be 80Ω.

The resin solution for printing D1 was applied onto the transparent electroconductive layer of the test piece with an ink jet printer, to obtain a layer of the resin solution for printing D1. The printing was performed on an area of 40 mm×50 mm, and thereby a zonal area on which the resin solution for printing D1 was not applied was provided with a width of 5 mm at two ends of the test piece. The layer of the resin solution for printing D1 was dried under the condition of 110° C. for 3 minutes, to form a resin layer that was an infrared light-shielding layer. Among four corners of the test piece having the resin layer, the resistance value between two adjacent corners between which the area having the resin layer was disposed was measured, and was found out to be 80Ω. The resistance value after formation of the resin layer did not change from the value before formation.

Example 2

(2-1. Preparation of Resin Solution for Printing)

A resin solution for printing D2 was obtained by the same manner as that described in (1-1. Preparation of resin solution for printing) of Example 1 except that the following matters were changed.

The hydrogenated block copolymer (pellet (v)) produced in Production Example 1 was used instead of the silane modified product of the hydrogenated block copolymer (pellet (vi)).

Decahydronaphthalene (boiling point of 190° C.) was used instead of tridecane.

The viscosity of the resin solution for printing D2 was 15 cP.

(2-2. Formation of Resin Layer)

A resin layer with a thickness of 3.1 μm was formed by the same manner as that described in (1-2. Formation of resin layer) of Example 1 except that the resin solution for printing D2 was used instead of the resin solution for printing D1.

(2-3. Optical Characteristics of Resin Layer)

Regarding the resin layer obtained in (2-2), the light transmittance and the haze value were measured by the same manner as that described in (1-3. Optical characteristics of resin layer) of Example 1.

As a result, it was found that the resin layer showed light transmittances indicated below and had sufficient light-shielding properties in the near infrared region.

800 nm: 77%
1,150 nm: 60%
1,500 nm: 17%
2,000 nm: 2.4%

The haze value of the resin layer was 0.8%.

(2-4. Change in Resistance Value of Transparent Electroconductive Layer)

The resistance value was measured by the same manner as that described in (1-4. Change in resistance value of transparent electroconductive layer) of Example 1 except that the resin solution for printing D2 was used instead of the resin solution for printing D1. The measured resistance value of the test piece after formation of the resin layer was 80Ω. The resistance value after formation of the resin layer did not change from the value before formation.

Comparative Example 1

(C1-1. Preparation of Resin Solution for Printing)

A resin solution for printing CD1 was obtained by the same manner as that described in (1-1. Preparation of resin solution for printing) of Example 1 except that the following matter was changed.

ITO particle dispersion liquid was not added.

The viscosity of the resin solution for printing was 10 cP.

(C1-2. Formation of Resin Layer)

A resin layer with a thickness of 3 μm was formed by the same manner as that described in (1-2. Formation of resin layer) of Example 1 except that the resin solution for printing CD1 was used instead of the resin solution for printing D1.

(C1-3. Optical Characteristics of Resin Layer)

Regarding the resin layer obtained in (C1-2), the light transmittance and the haze value were measured by the same manner as that described in (1-3. Optical characteristics of resin layer) of Example 1.

As a result, it was found that the resin layer showed light transmittances indicated below and had insufficient light-shielding properties in the near infrared region.

800 nm: 92%
1,150 nm: 93%
1,500 nm: 93%
2,000 nm: 91%

The haze value of the resin layer was 0.2%.

When the light transmittance of the resin layer (resin layer 1) obtained from the resin solution for printing D1 containing ITO particles is compared to that of the resin layer (resin layer C1) obtained from the resin solution for printing CD1 containing no ITO particles, the light transmittances of the resin layer 1 were smaller than that of the resin layer C1 at least for light with wavelengths of 800 nm, 1,150 nm, and 1,500 nm.

Therefore, it was found that the ITO particles contained in the resin solution for printing D1 absorb or reflect light with a wavelength contained in at least a portion of the wavelength range of 350 nm or more and 1,500 nm or less.

Comparative Example 2

(C2-1. Preparation of Resin Solution for Printing)

A resin solution for printing CD2 was obtained by the same manner as that described in (1-1. Preparation of resin solution for printing) of Example 1 except that the following matters were changed.

Tetrahydrofuran (boiling point of 61° C.) was used instead of tridecane.

ITO particle dispersion liquid was not added.

The viscosity of the resin solution for printing CD2 was 6 cP.

(C2-2. Formation of Resin Layer)

A resin layer with a thickness of 1 μm was formed by the same manner as that described in (1-2. Formation of resin layer) of Example 1 except that the resin solution for printing CD2 was used instead of the resin solution for printing D1. In the application process with the ink jet printer, the nozzles of the printer head were clogged at a plurality of locations, and as a result, streak-like thickness unevenness occurred in the resin layer. Alternatively, the application process had to be stopped.

(C2-3. Change in Resistance Value of Transparent Electroconductive Layer)

A resistance value was measured by the same manner as that described in (1-4. Change in resistance value of transparent electroconductive layer) of Example 1 except that the resin solution for printing CD2 was used instead of the resin solution for printing D1. The resistance value measured for the test piece after the resin layer was formed increased from the value before the resin layer was formed.

Comparative Example 3

(C3-1. Preparation of Resin Solution for Printing)

A resin solution for printing CD3 was obtained by the same manner as that described in (1-1. Preparation of resin solution for printing) of Example 1 except that the following matter was changed.

Cyclohexane (boiling point of 80° C.) was used instead of tridecane.

The viscosity of the resin solution for printing CD3 was 7 cP.

(C3-2. Formation of Resin Layer)

An attempt was made to apply the resin solution for printing CD3 onto a glass plate with the ink jet printer. However, the nozzles of the printer head were clogged at a plurality of locations, and as a result, streak-like thickness unevenness occurred in the resin layer. Alternatively, the application process had to be stopped.

Comparative Example 4

(C4-1. Preparation of Resin Solution for Printing)

A resin solution for printing CD4 was obtained by the same manner as that described in (1-1. Preparation of resin solution for printing) of Example 1 except that the following matter was changed.

The amount of tridecane was changed from 103.5 parts to 28.5 parts.

The viscosity of the resin solution for printing CD4 was 60 cP.

(C4-2. Formation of Resin Layer)

An attempt was made to apply the resin solution for printing CD4 onto a glass plate with the ink jet printer. However, all of the nozzles of the printer head were completely clogged, and the application process had to be stopped.

From the aforementioned results, the following matters are found.

The resin solutions for printing of Examples 1 and 2 do not cause nozzle clogging, and can be used in printing by an ink jet printing method. It is found that the resin layers formed from the resin solutions for printing of Examples 1 and 2 have sufficient light-shielding properties in a near infrared region, and the contained ITO particles hold a desired function in which light with a wavelength in the near infrared region is absorbed or reflected. In addition, it is found that application of the resin solutions for printing of Examples 1 and 2 onto an electronic material containing a silver nanowire and PEDOT does not cause changing of the resistance value of the material, and accordingly the resin solutions for printing can be applied onto the electronic material.

In contrast, it is found that since the resin solution for printing of Comparative Example 1 does not contain ITO particles, the obtained resin layer does not have sufficient light-shielding properties in a desired near infrared region.

It is found that the resin solution for printing of Comparative Example 2 that does not contain a nonpolar solvent causes nozzle clogging during printing, and is not suitable for an ink jet printing method. It is found that when the resin solution is applied onto an electronic material, the resistance value of the material changes.

It is found that the resin solution for printing of Comparative Example 3 that does not contain a nonpolar solvent with a boiling point of 125° C. or higher causes nozzle clogging during printing, and is not suitable for an ink jet printing method.

It is found that the resin solution for printing of Comparative Example 4 that has a viscosity of more than 50 cP causes nozzle clogging during printing, and is not suitable for an ink jet printing method.

Example 3

2 Parts of a dispersant containing as a main component a 12-hydroxystearic acid oligomer and 188 parts of dodecane were added to 10 parts of zinc oxide particles ("NANOFINE-50LP" manufactured by Sakai Chemical Industry Co., Ltd., average particle diameter of primary particles of 20 nm), and the zinc oxide particles were dispersed with a paint shaker. The mixture was filtered through a polyester mesh with an aperture of 5 µm, to prepare a zinc oxide particle dispersion liquid. The average particle diameter of zinc oxide may be measured by the same manner as that for ITO particles of Example 1 by observation of particles with a transmission electron microscope (TEM).

Subsequently, 80 parts of dodecane (boiling point of 216° C.) was added to 20 parts of the silane modified product of the hydrogenated block copolymer (pellet (vi)) produced in Production Example 2, and the pellet (vi) was dissolved, to obtain a resin solution. To the obtained resin solution, the zinc oxide particle dispersion liquid was added at a weight ratio of the resin solution relative to the zinc oxide particle dispersion liquid of 1:1, to produce a zinc oxide-dispersed resin solution for printing containing zinc oxide particles in an amount of 19% relative to the solid content. The viscosity of the resin solution for printing was 12 cP.

A sequence of steps of applying the obtained zinc oxide-dispersed resin solution for printing onto a glass plate with an ink jet printer to form a coating layer, and drying the coating layer on a hot plate of 130° C. for 3 minutes was repeated three times, to produce a patterned ultraviolet light (UV) absorption layer as a resin layer. In the application process with the ink jet printer, a good resin layer having no thickness unevenness was formed without nozzle clogging the printer head. The thickness of the dried UV absorption layer was 5 The light transmittance of the UV absorption layer at 380 nm was measured with a spectrophotometer ("V-570" manufactured by JASCO Corporation). As a result it was confirmed that, whereas the ultraviolet light transmittance at 380 nm of the resin layer not containing zinc oxide particles was 91%, the ultraviolet light transmittance at 380 nm of the UV absorption layer containing zinc oxide particles was reduced to 10%. Therefore, it is found that the zinc oxide particles contained in the zinc oxide-dispersed resin solution for printing absorb or reflect light with a wavelength contained in at least a portion of a wavelength region of 350 nm or more and 1,500 nm or less.

A resistance value was measured by the same manner as that described in (1-4. Change in resistance value of transparent electroconductive layer) of Example 1 except that the zinc oxide-dispersed resin solution for printing was used instead of the resin solution for printing D1. The measured resistance value of the test piece after formation of the resin layer was 80Ω. The resistance value after formation of the resin layer did not change from the value before formation.

Example 4

To 3 parts of "titanium black particles" (average particle diameter of the primary particles being 70 nm, measured by laser diffraction particle size analyzer), 0.3 part of a dispersant containing a 12-hydroxystearic acid oligomer as a main component and 196.7 parts of dodecane were added. The titanium black particles were dispersed with a paint shaker, thereby preparing a titanium black dispersion liquid.

Subsequently, 80 parts of dodecane was added to 20 parts of the silane modified product of the hydrogenated block copolymer (pellet (vi)) obtained in Production Example 2 to obtain a resin solution. The titanium black dispersion liquid was added to the obtained resin solution so that the weight ratio of the resin solution:titanium black dispersion liquid was 1:1, so that a titanium black-dispersed resin solution for printing containing 7% of titanium black particles relative to the solid content was prepared. The viscosity of the resin solution for printing was 11 cP.

A sequence of steps of applying the obtained titanium black-dispersed resin solution for printing onto a glass plate with an ink jet printer to form a coating layer, and drying the coating layer on a hot plate of 130° C. for 3 minutes was repeated three times, to produce a light reducing layer as a resin layer. In the application process with the ink jet printer, a good resin layer having no thickness unevenness was formed without nozzle clogging of the printer head. The thickness of the dried light reducing layer was 6 µm.

The light transmittance of the light reducing layer was measured with a spectrophotometer ("V-570" manufactured by JASCO Corporation). The light reducing layer showed light transmittances indicated below and had light-shielding properties in the visible light region.

400 nm: 37%
500 nm: 43%
600 nm: 37%

A resin layer with a thickness of 6 μm was formed by the same manner as described above except that the titanium black particles and the dispersant containing the 12-hydroxystearic acid oligomer as a main component were not used. The resin layer containing no particles showed light transmittances indicated below 400 nm: 91%
500 nm: 92%
600 nm: 92%

A resistance value was measured by the same manner as that described in (1-4. Change in resistance value of transparent electroconductive layer) of Example 1 except that the titanium black-dispersed resin solution for printing was used instead of the resin solution for printing D1. The resistance value measured for the test piece after the resin layer was formed was 80Ω, which was not changed from the value before the resin layer was formed.

Example 5

To 7 parts of "titanium black particles" (average particle diameter of the primary particles being 70 nm, measured by laser diffraction particle size analyzer), 0.7 part of the dispersant containing the 12-hydroxystearic acid oligomer as a main component and 92.3 parts of tridecane were added. They were dispersed with a paint shaker, thereby preparing a titanium black dispersion liquid.

Subsequently, 97 parts of tridecane was added to 3 parts of the silane modified product of the hydrogenated block copolymer (pellet (vi)) obtained in Production Example 1 to obtain a resin solution. The titanium black dispersion liquid was added to the obtained resin solution so that the weight ratio of the resin solution:titanium black dispersion liquid was 1:1, so that a titanium black-dispersed resin solution for printing containing 65% of titanium black particles relative to the solid content was prepared. The viscosity of the resin solution for printing was 7 cP.

The obtained titanium black-dispersed resin solution for printing was applied onto a glass plate with an ink jet printer, to form a coating layer, and the coating layer was dried on a hot plate of 130° C. for 3 minutes, to produce a light reducing layer as a resin layer. In the application process with the ink jet printer, a good resin layer having no thickness unevenness was formed without nozzle clogging of the printer head. The thickness of the dried light reducing layer was 1 μm.

The light transmittance of the light reducing layer was measured with a spectrophotometer ("V-570" manufactured by JASCO Corporation). The light reducing layer showed a light transmittance of 16% at 550 nm and had light-shielding properties in the visible light region.

A resistance value was measured by the same manner as that described in (1-4. Change in resistance value of transparent electroconductive layer) of Example 1 except that the titanium black-dispersed resin solution for printing was used instead of the resin solution for printing D1. The resistance value measured for the test piece after the resin layer was formed was 80Ω, which was not changed from the value before the resin layer was formed.

From Examples 3 to 5, the following matters are found. The resin solutions for printing of Examples 3 to 5 do not cause nozzle clogging, and can be used in printing by an ink jet printing method. In addition, it is found that application of the resin solutions for printing of Examples 3 to 5 onto the electronic material containing a silver nanowire and PEDOT does not cause changing of the resistance value of the material, and accordingly the resin solutions for printing can be applied onto the electronic material.

The invention claimed is:

1. A resin solution for printing, comprising: a nonpolar solvent having a boiling point of 125° C. or higher, a thermoplastic elastomer; and a particle having a primary particle diameter of 1 nm or more and 200 nm or less, the resin solution having a viscosity of 1 cP or more and 50 cP or less,
   wherein the thermoplastic elastomer is a hydrogenated aromatic vinyl compound-conjugated diene block copolymer or a modified product of the hydrogenated aromatic vinyl compound-conjugated diene block copolymer with a silicon atom-containing polar group, a hydrogenation rate of the carbon-carbon unsaturated bond of the aromatic ring of the hydrogenated aromatic vinyl compound-conjugated diene block copolymer is 90% or more,
   the particle absorbs or reflects light with a wavelength contained in at least a portion of a wavelength region of 350 nm or more and 1,500 nm or less,
   a weight ratio of the particle in the total amount of the resin solution for printing is 0.1% by weight or more and 15% by weight or less, and
   the nonpolar solvent contains at least one selected from the group consisting of decahydronaphthalene, tridecane, cyclododecane, and tetradecane.

2. The resin solution for printing according to claim 1, wherein the particle contains a titanium black particle.

3. The resin solution for printing according to claim 1, wherein the particle contains a high resistance black pigment particle, wherein a surface resistance value of a resin layer having a thickness of 1 μm and formed from the resin solution containing the high resistance black pigment particle is equal to or higher than $10^{13}$ Ω/sq.

4. The resin solution for printing according to claim 1, further comprising a dispersant soluble in the nonpolar solvent.

5. The resin solution for printing according to claim 1, wherein the particle contains one or more selected from the group consisting of lanthanum hexaboride, cesium tungsten oxide, indium tin oxide, and antimony tin oxide.

* * * * *